United States Patent [19]

Bonell et al.

[11] Patent Number: 5,193,822
[45] Date of Patent: Mar. 16, 1993

[54] GASKET WITH REINFORCING CORE

[75] Inventors: Gerard Bonell, Manchester; Richard E. Arbuthnot, Solihill, both of England

[73] Assignee: Jamak Fabrication Europe, Ltd., Manchester, England

[21] Appl. No.: 690,707

[22] Filed: Apr. 24, 1991

[30] Foreign Application Priority Data

Apr. 25, 1990 [GB] United Kingdom ................ 9009227

[51] Int. Cl.⁵ .............................................. F16J 15/12
[52] U.S. Cl. .............................. 277/180; 277/235 A; 277/236; 428/130; 72/379.2
[58] Field of Search ............... 277/235 R, 235 B, 166, 277/215, 236, 227, 232, 233, 180, 235 A; 428/121, 130, 122, 125; 49/490, 491; 72/379.2

[56] References Cited

U.S. PATENT DOCUMENTS

| 1,472,133 | 10/1923 | Oven | 277/235 B |
| 1,985,473 | 12/1934 | Victor | 277/235 B |
| 3,352,564 | 11/1967 | Johnson | 277/235 B |
| 3,542,382 | 11/1970 | Hagmann | 277/235 R X |
| 3,653,674 | 4/1972 | Bennigsen | 277/235 R X |
| 3,841,289 | 10/1974 | Meyers | 277/233 X |
| 4,387,904 | 6/1983 | Nicholson | 277/235 B |
| 4,400,000 | 8/1983 | Moerk, Jr. | |
| 4,620,710 | 11/1986 | Lambert et al. | 277/235 B |
| 4,655,463 | 4/1987 | Inciong et al. | 277/235 B X |
| 4,813,691 | 3/1989 | Schoenborn | 277/235 B |
| 5,033,756 | 7/1991 | Sixsmith et al. | 277/235 R X |

FOREIGN PATENT DOCUMENTS 88300479.8 7/1988 European Pat. Off. .
3831414A1 3/1990 Fed. Rep. of Germany .
3927340C1 10/1990 Fed. Rep. of Germany .

Primary Examiner—William A. Cuchlinski, Jr.
Assistant Examiner—James K. Folker
Attorney, Agent, or Firm—Kech, Mahin & Cate

[57] ABSTRACT

A gasket comprises a peripheral loop of sheet metal encased in an elastomeric material, the core being locally thickened, preferably in the vicinity of fixing screws by lateral projections from the stamping which are folded over to double the thickness, and the double thickness is then joggled to distribute the thicker portions symmetrically of the single sheet portion, the thickened portion then being closed to control the dimensions more accurately and tend to lock the edges together.

4 Claims, 2 Drawing Sheets

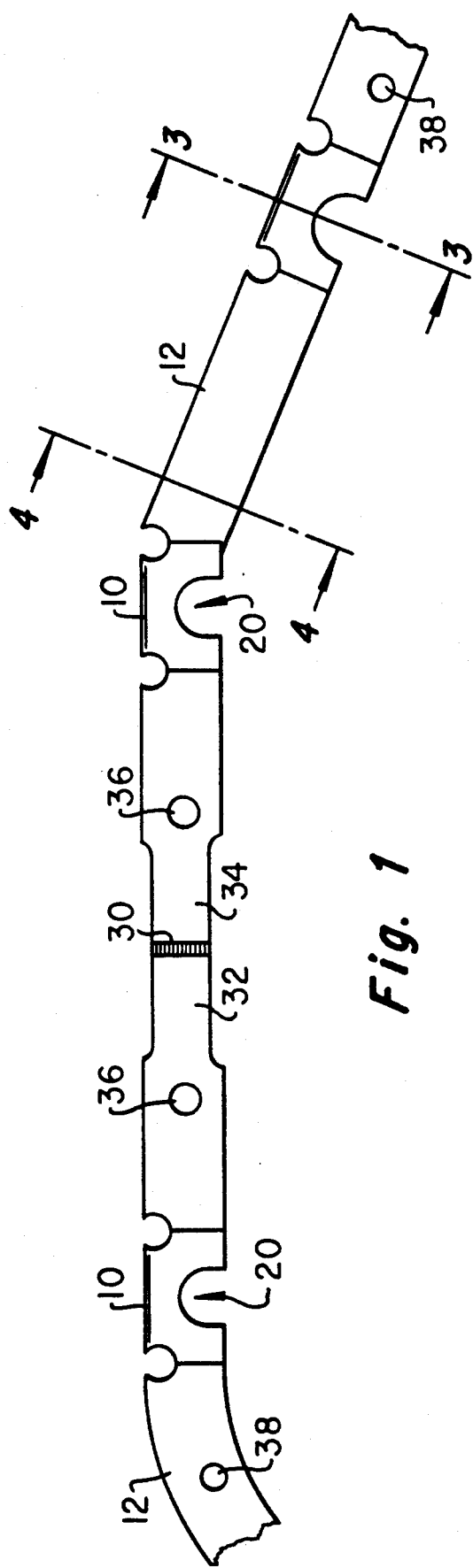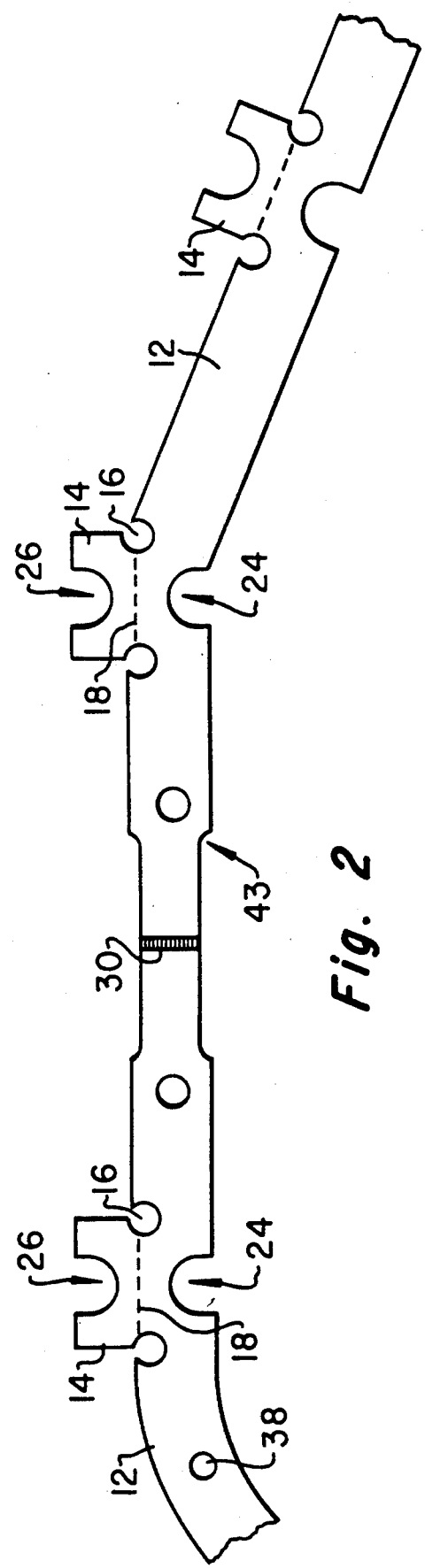

GASKET WITH REINFORCING CORE

BACKGROUND OF THE INVENTION

1. Field of the Invention

This invention relates to gaskets for use in making fluid tight seals between two components.

2. Description of the Prior Art

The gasket material is selected for its suitability in view of the location. For example, a gasket for an I.C. engine will at different locations be exposed to coolant fluid which may be a water/anti-freeze/anti-oxidant mixture, lubricating oil, fuel/air mixtures, and/or products of combustion, and in any of these instances at high or low temperatures.

The gasketted joint is often required to be clamped tight under specific designed loading. This clamping pressure is applied at (often) a number of specific points. For example a crank case may be bolted to the cylinder block at perhaps 10 or 20 points, being held by screws passing through apertures in the gasket.

Certain elastomers are found to be very suitable for gasket use in terms of being unaffected by the ambient conditions, but are overly ductile, and liable to be extruded out of the joint if the same is over tightened. The available tolerance may not be sufficient for practical purposes, in view of the required clamping pressures for other reasons. This is true of certain silicon rubbers for example.

Known solutions to this problem have involved making a series of inserts which are turned parts or sintered powder metal compacts of precise dimensions, which are then attached to for example a sheet metal pressing which forms a reinforcing core extending around the periphery of the gasket, and this core is encased with the elastomer.

When clamped tight, the elastomer is compressed sufficiently to form a fluid-tight seal between the two clamped parts. The inserts act as spacers between the clamped parts and maintain the integrity of the elastomer between the spacers. But this is an expensive solution.

The object of the invention is to solve the problem in an inexpensive way.

SUMMARY OF THE INVENTION

In accordance with the invention, a gasket comprises a reinforcing core which is encased over a substantial portion of the peripheral length of the gasket by an elastomeric material and said core is locally thickened at a plurality of points along said length by portions made integrally and unitarily from the reinforcing material.

Preferably the core is a stamping from sheet metal which is of substantially uniform thickness, and is locally thickened by a folding operation so that at least two thicknesses are present at said points.

In one possibility, the stamping is formed with laterally projecting lugs which are folded to double or treble thickness at those positions. In the former case (doubling) it is preferred to joggle the doubled thickness so as to distribute the material symmetrically about a plane containing the periphery of the gasket. With a treble thickness, the folded lugs may lie on opposite faces of the original material and hence be symmetrically distributed without requiring joggling.

Preferably also the thicker part is coined so as to have the effect of closely controlling the dimensions and this will also, so it is believed, tend to lock the edges of the laminae together and unify them.

The double portions may correspond with the locations of clamping screws. Precise gasket location with respect to all of the screws may be afforded by making recesses or open ended slots in the doubled portions, with the recess or slot edge coined to precise dimensional tolerances with respect to the complete gasket. The holes may be pierced after the folding.

A further contribution towards precision and accuracy is provided, according to a feature of the invention, by punching generally circular holes in the original sheet material from which the reinforcing core is made, at positions corresponding to the end of each line where a fold is required.

Gaskets are of this kind are most usually made as a continuous peripheral loop formation. According to a further aspect of the invention, the reinforcement is made in two parts meeting end to end. Thus the two parts may be L shaped or U shaped for example. The free ends of the two components which are to be subsequently joined together are made of a reduced thickness and width, and then welded together, and the weld is subsequently flattened so as to maintain the overall dimensions of the welds joint within the dimensions of the pressing at other locations.

BRIEF DESCRIPTION OF THE DRAWINGS

One embodiment of the invention is now more particularly described with reference to the accompanying drawings wherein:

FIG. 1 is a fragmentary end view of a reinforcement for a gasket;

FIG. 2 is an even more fragmentary view of the same at an earlier stage of manufacture.

DESCRIPTION OF THE PREFERRED EMBODIMENT

Turning now to the drawings, the gasket comprises a (usually) loop-like member having a reinforcing core encased in elastomer. In order to minimise wastage of sheet material in forming the core, it is made of two or more parts joined together. Each of the parts is generally strip like. The strip is of uniform width and in this example is locally thickened at the position of fixing screws.

Figure 3:
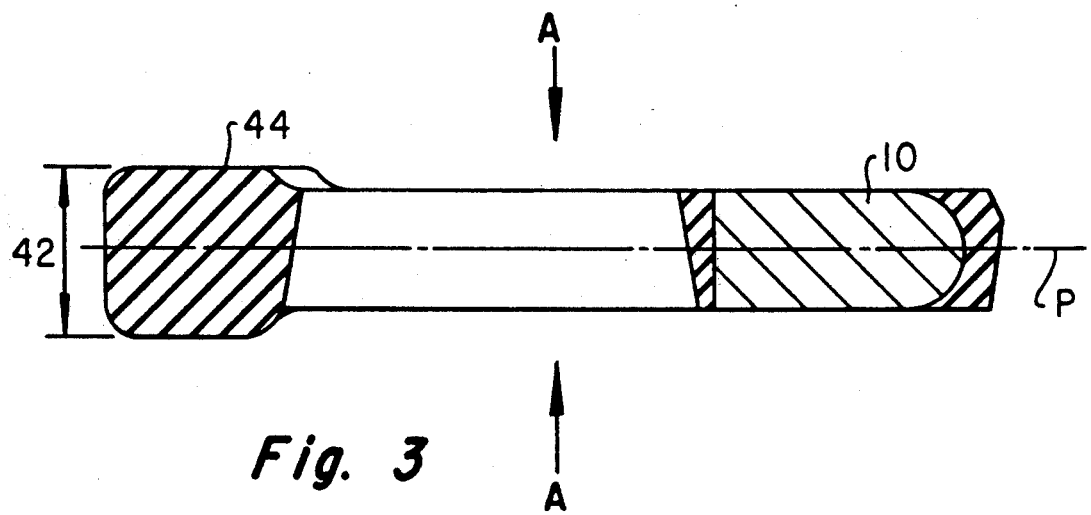
FIGS. 3 and 4 are sections on the line 3.3 and 4.4 but through the complete gasket on an enlarged scale.
Figure 4:
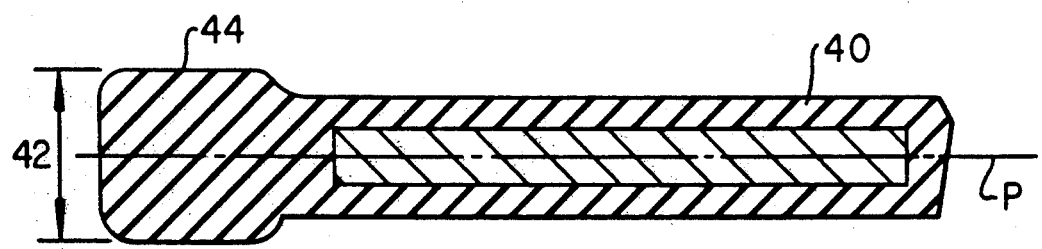

In FIG. 1 the local thickened areas 10 comprises two thicknesses of the sheet material and hence these areas are twice the thickness of the intervening strip portions 12 which extend between the locally thickened zones. The thickened portions are joggled so as to be symmetrically distributed about the plane P, FIGS. 3 and 4.

FIG. 2 shows the metal gasket reinforcement at an earlier stage of manufacture when lugs 14 extend laterally of the portions 12, before they are folded over to form the thickened portions. The lugs may extend inwardly or outwardly of the loop. A substantially circular hole 16 is punched at a position which will lie at each end of each fold line 18 to facilitate the folding operation and provide a more accurate location for the fold. The arcuate recesses 20, FIG. 1, which are to locate on the fixing screws, may be punched at the FIG. 2 stage, or at the FIG. 1 stage after folding, or a combination of the two meaning that one of the recesses e.g. 24 FIG. 2 may be pierced at the FIG. 2 stage and the other of the recesses 26 may be pierced at the FIG. 1 stage and possibly to closer dimensions so that the recess 24 has a greater clearance about the screw and the recess 26 locates with greater precision on the screw. In any event the thickened portion is preferably coined as a final operation to control the dimensions and location more precisely. The coining may have the effect of merging the edges of the recesses which may prevent any possible separation of the part 14 in the event of inaccurate location for example by a mechanic in subsequent maintenance of an engine fitted with such a gasket.

The joint between a pair of the reinforcing components is provided by the weld 30 provided on butt ends 32, 34 which, as shown, are narrower than the portions 12 and may also be of reduced thickness. The weld may be subject to a press blow or even a coining operation to ensure that the area of the weld lies within the dimensions of the strip portions 12.

Holes 36 are provided to jig the components for the welding operation. Further holes 38 are provided so that the encasing elastomer 40 extends through the strip for additional security. The ends to be welded together are reduced in width as at 32,34, and possibly also in thickness, so as to accommodate weld flash within the dimensions of the strip 12.

The casing elastomer is of a total thickness 42 greater than the thickened portions 10 in order to create a good gasketting seal over the whole periphery of the gasket, with controlled clamping between arrows A to the thickness of the portion 10.

While the invention has been shown in only one of its forms, it should be apparent to those skilled in the art that it is not so limited but susceptible to various changes without departing from the scope of the invention.

We claim:

1. A gasket having a peripheral length, comprising in combination:
    a reinforcing core being made of a reinforcing material and being encased over a substantial portion of the peripheral length of the gasket by an elastomeric material;
    the core being locally thickened at a plurality of thickened points along the peripheral length by portions made integrally and unitarily from the reinforcing material;
    the core being a stamping from sheet metal which is of substantially uniform thickness, and which is locally thickened by a folding operation so that at least two thicknesses are present at the thickened points;
    the locally thickened portions having apertures for receiving clamping screws; and
    the apertures being open-ended slots in the thickened portions which have slot edges that are coined.

2. A gasket having a peripheral length, comprising in combination:
    a reinforcing core being made of a reinforcing material and being encased over a substantial portion of the peripheral length of the gasket by an elastomeric material;
    the core being locally thickened at a plurality of thickened points along the peripheral length by portions made integrally and unitarily from the reinforcing material;
    the core being a stamping from sheet metal which is of substantially uniform thickness, and which is locally thickened by a folding operation so that at least two thicknesses are present at the thickened points; and
    the sheet metal from which the reinforcing core is to be made by stamping having generally circular holes punched therein at positions corresponding to the end of each line where a fold is required to provide the local thickening.

3. A gasket having a peripheral length and adapted to be clamped between two components, comprising in combination:
    a reinforcing core being made of a reinforcing material and being encased over a substantial portion of the peripheral length of the gasket by an elastomeric material;
    the core being locally thickened at a plurality of thickened points along the peripheral length by thickened portions made integrally and unitarily from the reinforcing material; said locally thickened portions having apertures for receiving clamping screws; and
    the elastomeric material initially having a portion with a thickness greater than the thickened portions, and when clamped between the two components, the elastomeric material deforming to the thickness of the thickened portions, wherein the apertures are open-ended slots in the thickened portions.

4. A gasket having a peripheral length and adapted to be clamped between two components, comprising in combination:
    a reinforcing core being made of a reinforcing material and being encased over a substantial portion of the peripheral length of the gasket by an elastomeric material;
    the core being locally thickened at a plurality of thickened points along the peripheral length by thickened portions made integrally and unitarily from the reinforcing material; the core being a stamping from sheet metal which is of substantially uniform thickness, and which is locally thickened by a folding operation so that at least two thicknesses are present at the thickened points;
    the sheet metal from which the reinforcing core is to be made by stamping having generally circular holes punched therein at positions corresponding to the end of each line where a fold is required to provide the local thickening; and
    the elastomeric material initially having a portion with a thickness greater than the thickened portions, and when clamped between the two components, the elastomeric material deforming to the thickness of the thickened portions.

* * * * *